United States Patent [19]
Kim et al.

[11] Patent Number: 6,038,008
[45] Date of Patent: Mar. 14, 2000

[54] METHOD OF MAKING LCD HAVING ROUGHENED STEPS OF THE PROTECTION LAYER

[75] Inventors: Jeong-Hyun Kim; Jae-Yong Park; Woong-Kwon Kim, all of Kyunggi-do; Kyoung-Nam Lim, Seoul; Sung-Il Park, Taegu, all of Rep. of Korea

[73] Assignee: LG Electronics Inc., Seoul, Rep. of Korea

[21] Appl. No.: 08/964,914

[22] Filed: Nov. 5, 1997

[30] Foreign Application Priority Data

Nov. 29, 1996 [KR] Rep. of Korea ............... P96-59475

[51] Int. Cl.[7] .......................... G02F 1/1333; G02F 1/13
[52] U.S. Cl. ............................. 349/138; 349/187
[58] Field of Search ............... 349/138, 42, 187

[56] References Cited

U.S. PATENT DOCUMENTS

| | | | |
|---|---|---|---|
| 4,431,272 | 2/1984 | Yazawa et al. | 350/336 |
| 4,451,525 | 5/1984 | Kawazoe et al. | 428/213 |
| 4,636,038 | 1/1987 | Kitahara et al. | 350/339 |
| 5,229,644 | 7/1993 | Wakai et al. | 257/749 |
| 5,408,345 | 4/1995 | Mitsui et al. | 349/42 |
| 5,411,629 | 5/1995 | Warfield | 216/34 |
| 5,500,750 | 3/1996 | Kanbe et al. | 349/42 |
| 5,600,458 | 2/1997 | Okano et al. | 349/44 |
| 5,641,974 | 6/1997 | den Boer et al. | 257/59 |
| 5,724,111 | 3/1998 | Mizobata et al. | 349/113 |
| 5,844,647 | 12/1998 | Maruno et al. | 349/138 |

FOREIGN PATENT DOCUMENTS

| | | |
|---|---|---|
| 0 536 898 A1 | 4/1993 | European Pat. Off. . |
| 0 589 478 A2 | 3/1994 | European Pat. Off. . |
| 0 589 478 A3 | 3/1994 | European Pat. Off. . |
| 63-2798228 | 11/1988 | Japan . |
| 63-289965 | 11/1988 | Japan . |
| 4-068318 | 3/1992 | Japan . |
| 4-163528 | 6/1992 | Japan . |
| 5-203936 | 8/1993 | Japan .................................. 349/138 |
| 2 311 653 | 10/1997 | United Kingdom . |

OTHER PUBLICATIONS

M.J. Radler et al., Cyclotene™ Advanced Electronics Resins for High–Aperture AMLCD Applications, SID 96 Applications Digest, pp. 33–36 (1996).

D.J. Perettie et al., Benzocyclobutene as a Planarization Overcoat for Flat Panel Displays, ASIA Display '95, pp. 721–724 (1995).

Koji Kishimoto, Low–dielectric–constant interlayer insulating film and its manufacturing method, Electronic Journal, pp 33–35 (Mar. 1996).

Toshihara Ueki et al., Dye embedded BM resin and three dimensional picture element implemented by BM on Array technology for the first time, Nikkei Microdevices, pp. 60–62 (Jul. 1994).

*Primary Examiner*—William L. Sikes
*Assistant Examiner*—Toan Ton
*Attorney, Agent, or Firm*—Morgan, Lewis & Bockius LLP

[57] ABSTRACT

A method is provided for manufacturing a liquid crystal display having a gate bus line, a data bus line, and a switching element with a drain electrode over a substrate. The method includes the steps of forming a protection layer over the substrate to cover the gate bus line, the data bus line and the switching element, roughening the surface of the protection layer, removing a portion of the protection layer to define a contact hole in the protection layer over the drain electrode of the switching element, and forming a pixel electrode on the roughened surface of the protection layer, the pixel electrode being connected to the drain electrode through the contact hole.

20 Claims, 6 Drawing Sheets

METHOD OF MAKING LCD HAVING ROUGHENED STEPS OF THE PROTECTION LAYER

This application claims the benefit of Korean application No. P96-59475, filed on Nov. 29, 1996, which is hereby incorporated by reference.

BACKGROUND OF THE INVENTION

1. Field of the Invention

The present invention relates to a liquid crystal display (LCD) and a method of manufacturing the same, and more particularly, to a liquid crystal display having reduced defects and a method of manufacturing an LCD having thin film transistors (TFTs) as switching elements.

2. Discussion of the Related Art

Figure 1:
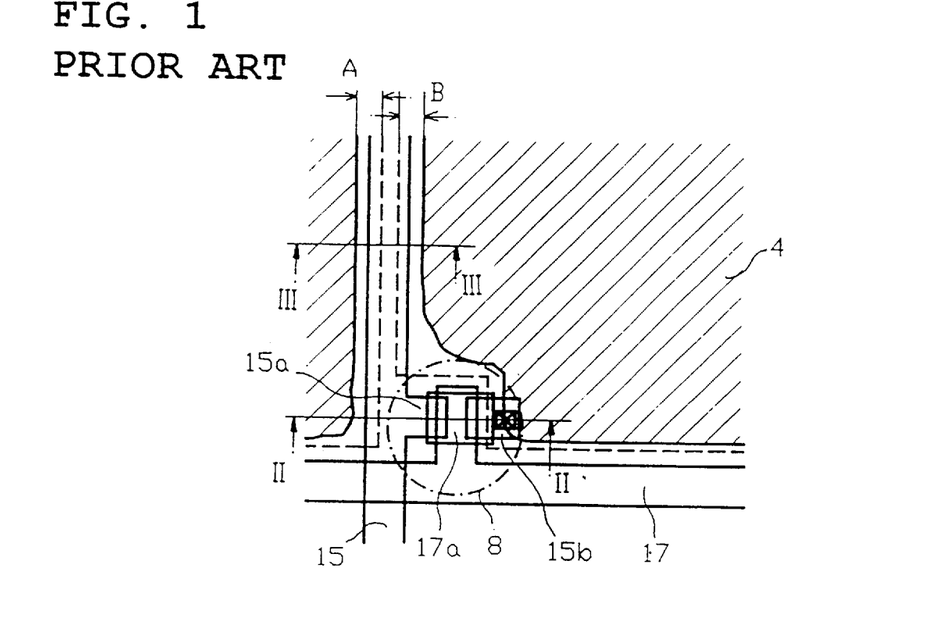
FIG. 1 is a plan view of a conventional LCD.

A conventional LCD is described with reference to FIG. 1. A gate bus line 17 is horizontally formed and a gate electrode 17a is branched off from the gate bus line 17. A data bus line 15 is vertically formed and a source electrode 15a is branched off from the source bus line 15. A TFT 8 is formed near the intersection between the gate bus line 17 and the source bus line 15. A drain electrode 15b is formed to be electrically connected to a pixel electrode 4.

The structure of the conventional LCD is described in more detail with reference to FIGS. 2 and 3, which show cross-sectional views taken along lines II—II and III—III in FIG. 1, respectively.

Figure 2:
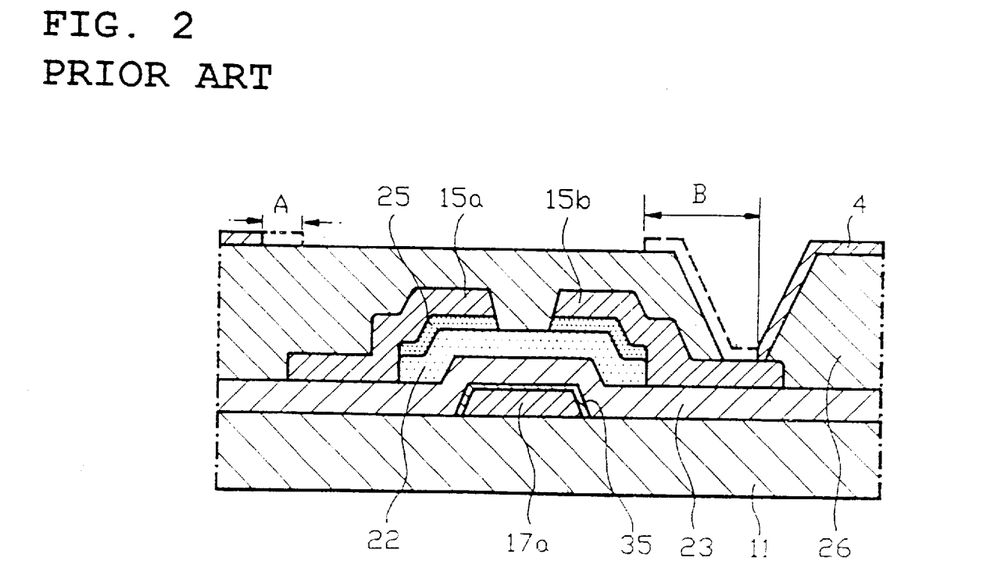
FIGS. 2 and 3 are cross-sectional views of the conventional LCD.

Referring to FIG. 2, a gate electrode 17a, which is branched off from a gate bus line, is formed on a transparent substrate 11. An anodic oxidized layer 35 is formed on the gate electrode 17a to improve insulation property of the gate electrode 17a and to prevent hillocks. A gate insulating layer 23, which is made of an inorganic material such as $SiN_x$ or $SiO_x$, is formed on the surface of the entire surface of the transparent substrate 11 including the gate electrode 17a. A semiconductor layer 22 made of amorphous silicone (a-Si) is formed on the gate insulating layer 23 over the gate electrode 17a. An ohmic contact layer 25 is formed on the semiconductor layer 22. A source electrode 15a branching off from the data bus lines 15 and a drain electrode 15b are formed with a certain distance in between, each of the electrodes being formed on the ohmic contact layer 25. A protection layer 26, which is made of an organic material such as benzocyclobutene (BCB), is formed to cover the entire surface of the substrate 11 including the source electrode 15a and the drain electrode 15b. A pixel electrode 4 is formed of a transparent conductive material, such as indium tin oxide (ITO), on the protection layer 26 to be connected to the drain electrode 15b through a contact hole 31 formed in the protection layer 26. Reference letters A and B in FIGS. 1 to 3 show over-etched portions of the pixel electrode 4.

Figure 3:
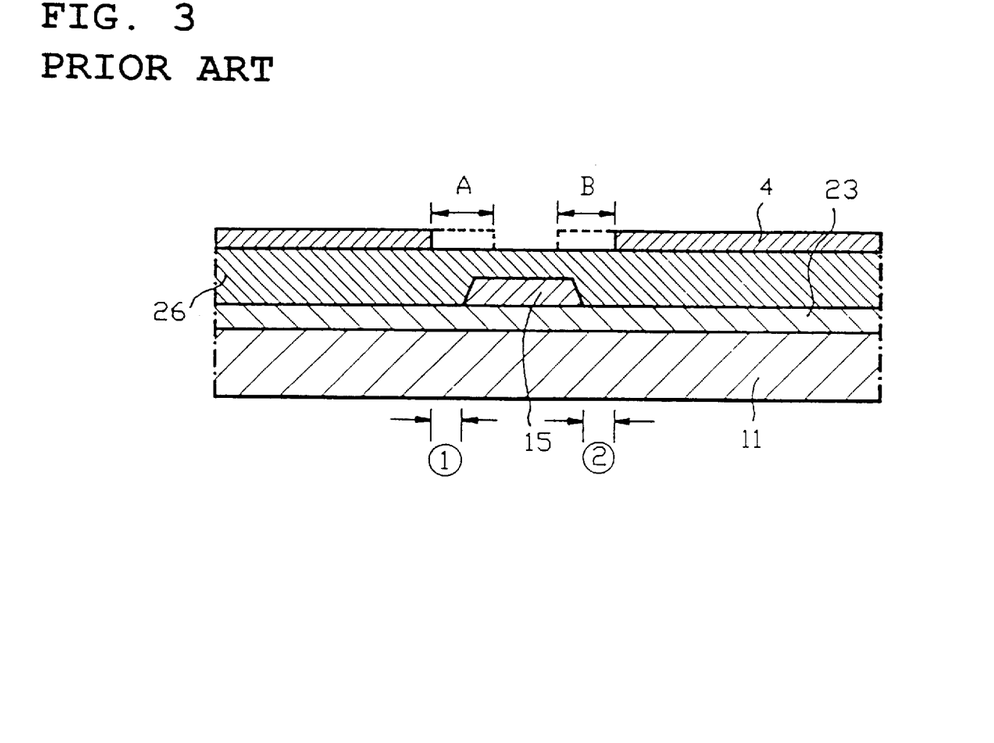

Referring to FIG. 3, the gate insulating layer 23, which is made of inorganic insulating material, such as $SiN_x$ or $SiO_x$, is formed on the transparent substrate 11, and the data bus line 15 is formed thereon. The protection layer 26, which is made of BCB, covers the entire surface of the substrate including the data bus line 15, on which the pixel electrode 4 is to be formed. Reference letters A and B indicate over-etched portions of the pixel electrode 4. Due to these over-etched portions, light leakage occurs in the areas indicated by ① and ②.

In the conventional LCDs, the protection layer 26 is formed of an organic insulating material, such as BCB, which has a good leveling property and a lower dielectric constant than that of an inorganic insulating material. Therefore, the pixel electrode 4 can be formed to overlap the data bus line 15. As a result, the aperture ratio of the LCD can be improved.

The pixel electrode 4, however, can not be formed to a designed pattern (illustrated by dashed lines in FIG. 1) in practice. This is because during the removal of indium tin oxide (ITO) by etching, etchant infiltrates into the interface between the ITO layer 4 and the organic insulating protection layer 26, resulting in over-etching of the ITO layer. The over-etched portions are illustrated by A and B in FIGS. 1 to 3. It is difficult to control these over-etched portions. Moreover, pixel electrode causes light leakage in the portions ① and ② of FIG. 3. Accordingly, contrast and display quality of the conventional LCD are deteriorated.

In detail, the ITO layer is over-etched by the etchant infiltrating into cracks in the ITO layer or interface between the ITO layer and the organic protection layer. The cracks are formed during depositing and patterning the ITO layer on the protection layer, due to the difference in thermal expansion coefficient between these two layers. The interface between these two layers has poor adhesion property.

Figure 4:
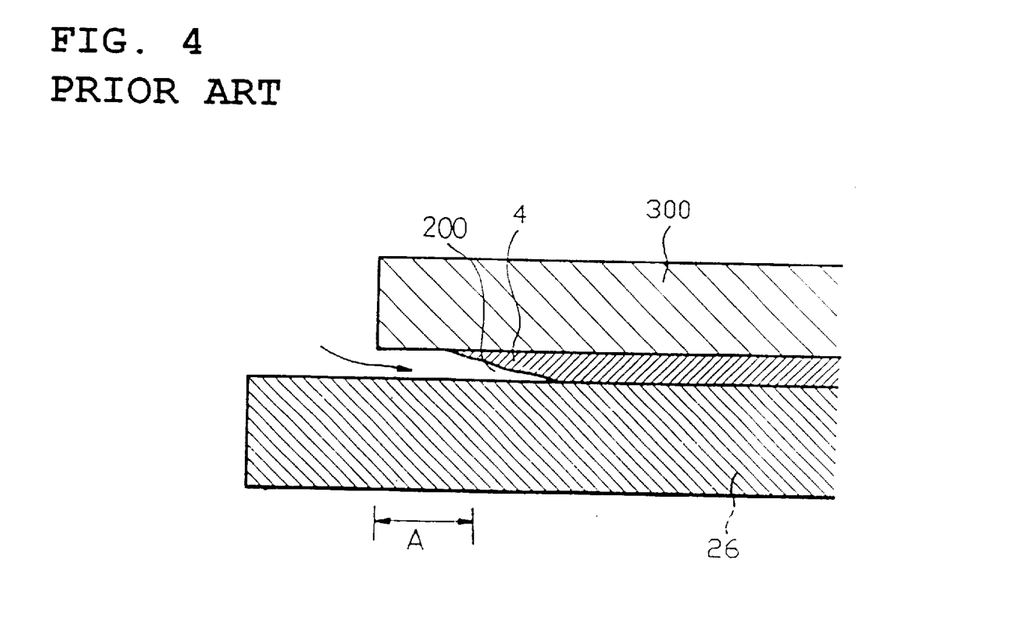
FIG. 4 is a cross-sectional view showing an over-etched ITO layer in the conventional LCD.

Referring to FIG. 4, when the ITO layer on the protection layer 26 made of an organic material, such as BCB, is patterned to form the pixel electrode 4 using a photoresist 300, the ITO layer is over-etched by as much as amount A by the etchant (indicated by a line with arrowheads) infiltrating into the interface 200.

SUMMARY OF THE INVENTION

Accordingly, the present invention is directed to a liquid crystal display and a method of manufacturing the same that substantially obviate the problems due to limitations and disadvantages of the related art.

An object of the invention is to provide an LCD having a precisely patterned pixel electrode on a protection layer made of an organic insulating material.

Another object of the invention is to provide an LCD having a high-aperture ratio with the improved manufacturing yield by precisely patterning the pixel electrode layer on the protection layer into a desired pattern.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a method of manufacturing a liquid crystal display having a gate bus line, a data bus line, and a switching element with a drain electrode over a substrate, the method including the steps of forming a protection layer over the substrate to cover the gate bus line, the data bus line and the switching element; roughening the surface of the protection layer; removing a portion of the protection layer to define a contact hole in the protection layer over the drain electrode of the switching element; and forming a pixel electrode on the roughened surface of the protection layer, the pixel electrode being connected to the drain electrode through the contact hole.

In another aspect, the present invention provides a liquid crystal display, including a substrate; a gate bus line over the substrate; a data bus line over the substrate; a switching element over the substrate; a protection layer covering the gate bus line, the data bus line, and the switching element, the protection layer having a substantially rough surface profile; and a pixel electrode over the rough surface of the protection layer.

In another aspect, the present invention provides a method of manufacturing a laminated structure of an organic layer and a transparent conductive layer over a substrate for use in an LCD, the method including the steps of forming the organic layer over the substrate; performing at least one of dry etching, sputter etching, and UV irradiation on the organic layer to roughen the exposed surface of the organic layer to increase the area of the exposed surface; and forming the transparent conductive layer on the roughened surface of the organic layer.

In a further aspect, the present invention provides a liquid crystal display substrate, including a substrate; a plurality of switching elements over the substrate; an organic insulating layer having a bottom surface and a top surface over the substrate, the bottom surface facing the substrate to cover the entire surface of the substrate including the plurality of switching elements, the top surface having a substantially rough profile that is substantially independent of a profile of the bottom surface; and a plurality of transparent conductive electrodes on the top surface of the organic insulating layer, each of the transparent conductive electrodes being connected to each of the switching elements.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

An LCD according to a preferred embodiment of the present invention includes an organic protection layer covering a gate bus line, a data bus line, and a switching element. A contact hole is formed in the organic protection layer. A pixel electrode formed on the organic protection layer is connected to the switching element through the contact hole. The surface of the organic protection layer is treated by a sputter etching, dry etching, or ultra-violet radiation (UV) treatment to produce a rough (or irregular) surface profile.

Figure 5:
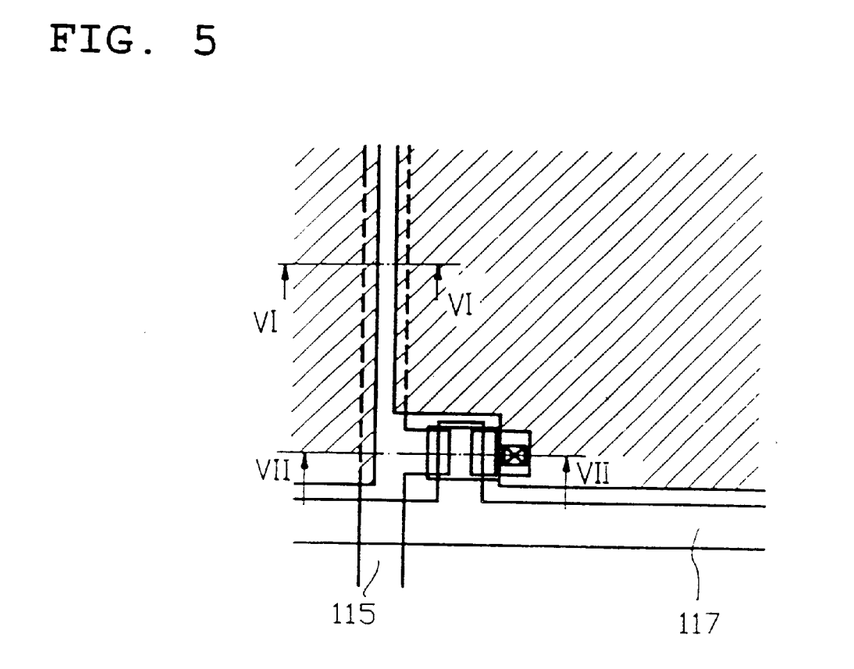
FIG. 5 is a plan view showing an LCD according to a preferred embodiment of the present invention.
Figure 6:
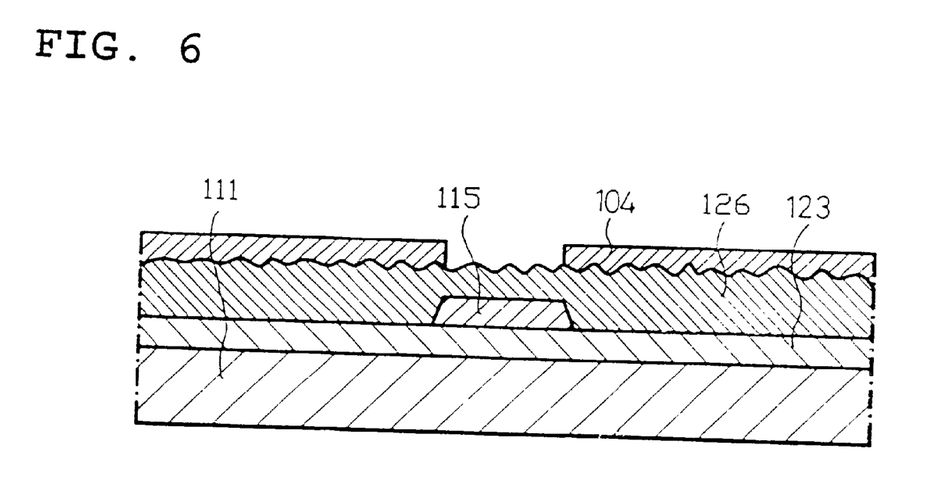
FIG. 6 is a cross-sectional view of the LCD taken along line VI—VI of FIG. 5.

FIGS. 5 and 6 show the LCD having the above-described structure according to the preferred embodiment of the present invention. FIG. 5 is a plan view showing the LCD, and FIG. 6 is a cross-sectional view of the LCD taken along line VI—VI of FIG. 5, where the reference numerals 104, 111, 115, 117, 123 and 126 indicate a pixel electrode, a transparent substrate, a data bus line, a gate bus line, a gate insulating layer and an organic protection layer, respectively.

As shown in FIG. 6, the organic protection layer 126 has a rough surface profile. The LCD having such a structure increases the interfacial area between the organic protection layer and the ITO layer (104 in this example). This improves adhesion between the organic protection layer and the ITO layer. Accordingly, infiltration of the etchant into the interface can effectively be prevented.

A method of manufacturing an LCD according to the present invention will be described below with reference to FIGS. 7A–7H. FIGS. 7A–7H are cross-sectional views taken along line VII—VII of FIG. 5, showing the steps of manufacturing the LCD.

Figure 7A:
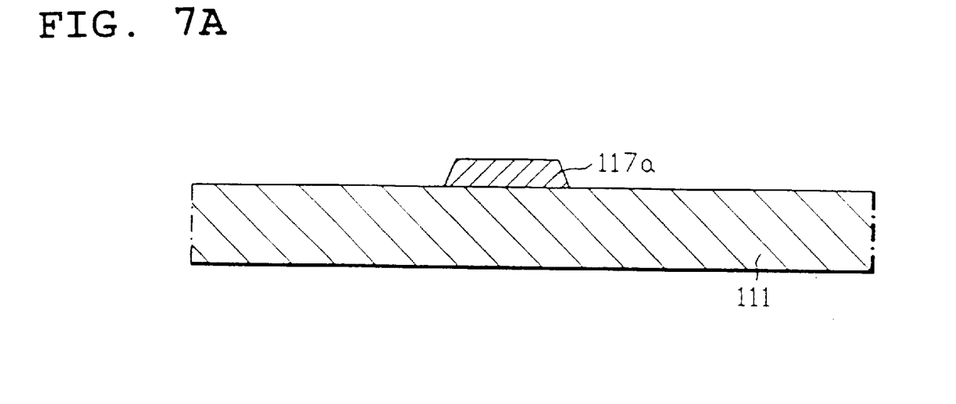
FIGS. 7A–7H are cross-sectional views showing manufacturing steps of an LCD according to a preferred embodiment of the present invention.

Referring to FIG. 7A, a first metal, such as Al, Al alloy, Cr or Mo, is deposited on a transparent substrate 111. A photoresist is coated on the metal layer and is developed to form a desired pattern. The gate electrode 117a branching off from a gate bus line (not shown in the figure) is formed by wet-etching the metal layer in accordance with the photoresist pattern. In this step, it is preferable to form the gate electrode 117a to be tapered in order to relieve sharp stepped profile (FIG. 7A).

Figure 7B:
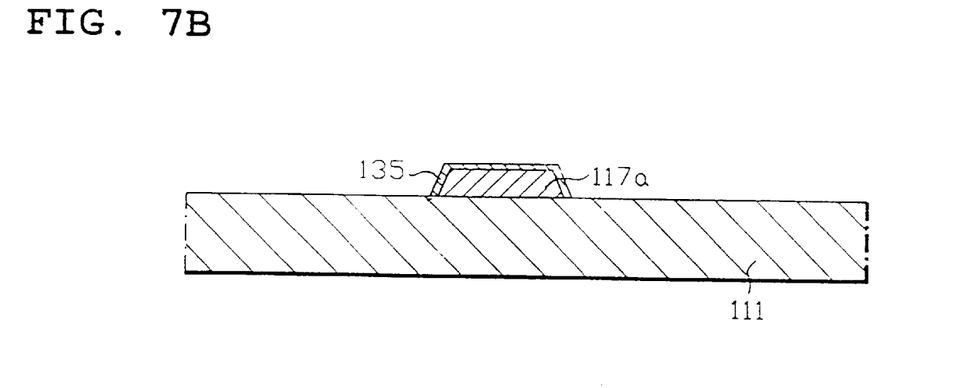
Figure 7C:
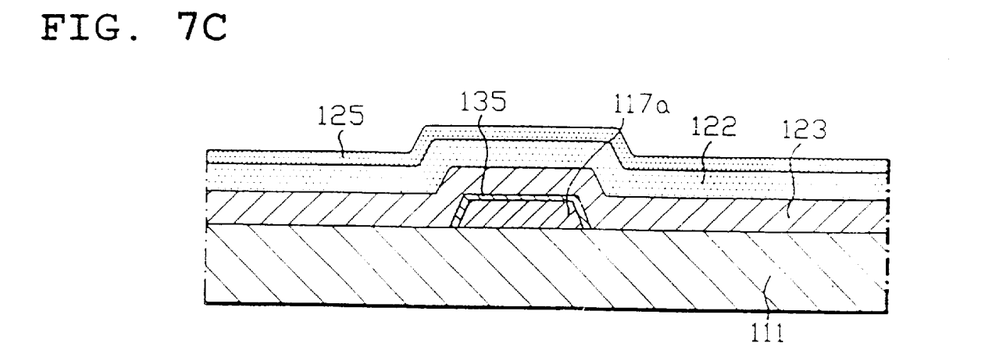

As shown in FIG. 7B, an anodic oxidized layer 135 is formed to cover the gate electrode 117a to improve the insulation property of the gate electrode 117a and to prevent hillocks. If Cr or Mo is used for the first metal, anodization is normally unnecessary. Then, inorganic material, such as $SiN_x$, or $SiO_x$ (of which a gate insulating layer 123 is formed), a-Si (of which a semiconductor layer 122 is formed) and $n^+$ a-Si (of which an ohmic contact layer 125 is formed) are sequentially deposited on the entire surface of the substrate, as shown in FIG. 7C.

Figure 7D:
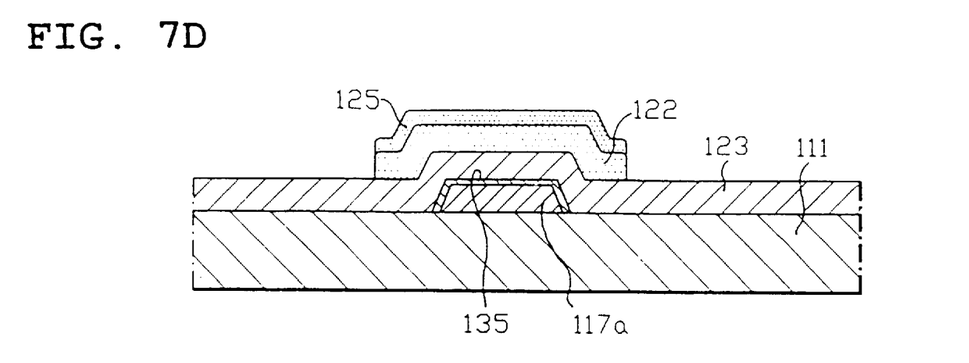

A photoresist is coated on the $n^+$ a-Si layer and is developed into a desired pattern. An ohmic contact layer 125 and a semiconductor layer 122 are formed by etching the $n^+$ a-Si layer and the a-Si layer in accordance with the photoresist pattern (FIG. 7D).

Figure 7E:
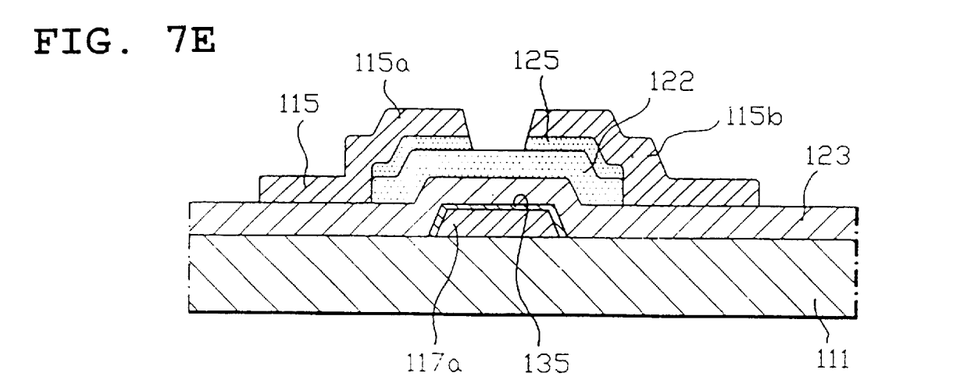

A second metal, such as Cr or Al, is deposited on the entire surface of the substrate including the ohmic contact layer 125. A photoresist is coated on the second metal layer and is developed into a desired pattern. A source electrode 115a branching off from a data bus line (not shown in the figure) and a drain electrode 115b are formed by etching the second metal in accordance with the photoresist pattern. An exposed portion of the ohmic contact layer 125 between the source and drain electrodes 115a, 115b is removed using the source and drain electrodes 115a and 115b as a mask (FIG. 7E).

Figure 7F:
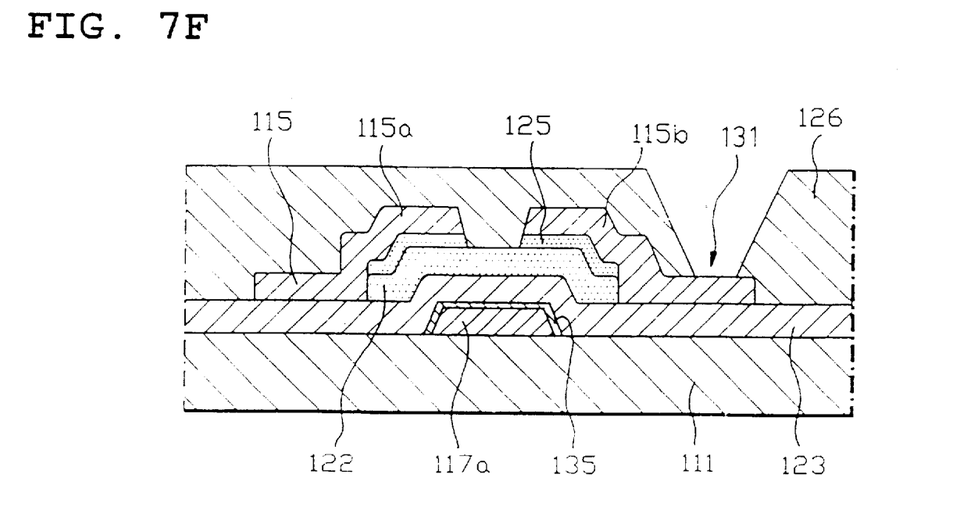

Referring to FIG. 7F, a protection layer 126 is formed on the overall surface, where the protection layer 126 is made of an organic insulating material selected from thermosetting resins, such as polyimide resin, acrylic resin, phenol, polyester, silicon, acryl, and urethane, and thermoplastic resins, such as polycarbonate, polyethylene, and polystyrene, as well as organic materials shown in Table 1 below, such as benzocyclobutene (BCB), fluorinated polyimide, perfluorocyclobutane (PFCB) and fluoropolyarylether (FPAE), and siloxane polymer.

Then, a photoresist is coated on the protection layer 126 and is developed into a desired pattern. A contact hole 131 is formed by etching the protection layer 126 in accordance with the photoresist pattern (FIG. 7F). The contact hole 131 is formed over the drain electrode 115b by a dry-etching method.

capacitance between the data bus line and a pixel electrode to be formed becomes small, thereby eliminating leakage current and cross-talks. If instead, the protection layer 126 is formed of an inorganic insulating material that has a relatively high relative dielectric constant, parasitic capacitance between the data bus lines and the pixel electrode would be much larger. This is because leakage current and cross-talks that occur at the pixel electrode are proportional to the parasitic capacitance.

TABLE 1-1

Dielectric Constant of organic materials

| Organic material | Dielectric constant | Structure |
|---|---|---|
| Fluorinated polyimide | 2.7 | |
| Teflon | 2.1–1.9 | |
| Cytop | 2.1 | |
| BCB | 2.7 | |
| Fluoro-poly-arylether | 2.6 | |
| Fluorinated para-xylene | 2.4 | |

If the protection layer 126 is photo-sensitive, the contact hole 131 can directly be formed without using the photoresist. The organic insulating material forming the protection layer 126 has a lower relative dielectric constant than inorganic insulating materials. Accordingly, parasitic In the present invention, leakage current and cross-talks can be prevented because the protection layer is made of an organic insulating material which has a relatively low relative dielectric constant. Furthermore, the surface of the protection layer 126 made of the organic insulating material has a substantially constant level over the entire region of the substrate, so that a uniform cell gap can be achieved and defects in an alignment film that may be generated during the rubbing step for liquid crystal can be reduced. Therefore, by forming the protection layer 126 of an organic insulating material, the LCD having a high aperture ratio and a uniform cell gap can be obtained.

Figure 7G:
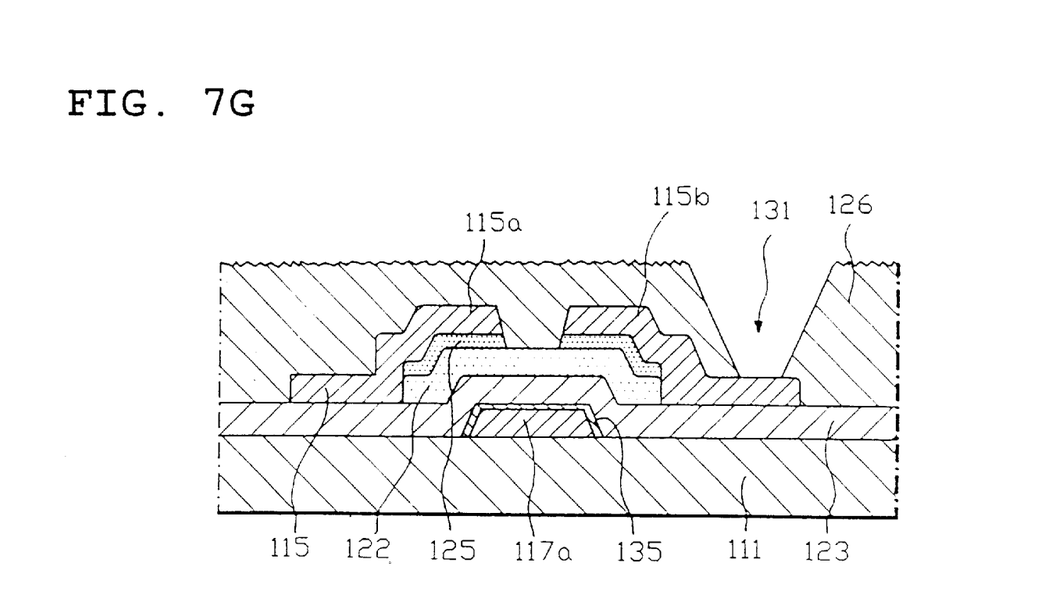

Thereafter, as shown in FIG. 7G the surface of the protection layer 126 is roughened by sputter etching, dry etching or a ultra-violet radiation (UV) treating method.

In this embodiment, the sputter etching uses an Ar, $O_2$ or Ar and $O_2$ containing plasma gas, for example, to cause a physical reaction on the surface of the protection layer 126. The reaction causes C or H radicals to break off from the surface, resulting in destruction of Si based bond structure on the surface. As a result, the surface of the protection layer 126 becomes rough.

The dry etching method etches the surface of the protection layer using a gas having F radicals or Cl radicals, each also containing $O_2$, for example. In this case, C or H radicals at the surface of the organic insulating protection layer 126 react with $O_2$ in the dry etching chamber, producing CO, $CO_2$ or $H_2O$. As a result, the surface of the protection layer 126 becomes rough.

The UV treating method breaks the Si based bond structure at the surface of the organic insulating protection layer 126 using high-energy (low-wavelength) radiation, stripping C or H radicals from the surface. As a result, the surface becomes rough.

Though the roughening step at the surface of the protection layer is performed after the contact hole forming step in the above-described preferred embodiment, the order of these two steps can be interchanged.

Figure 7H:
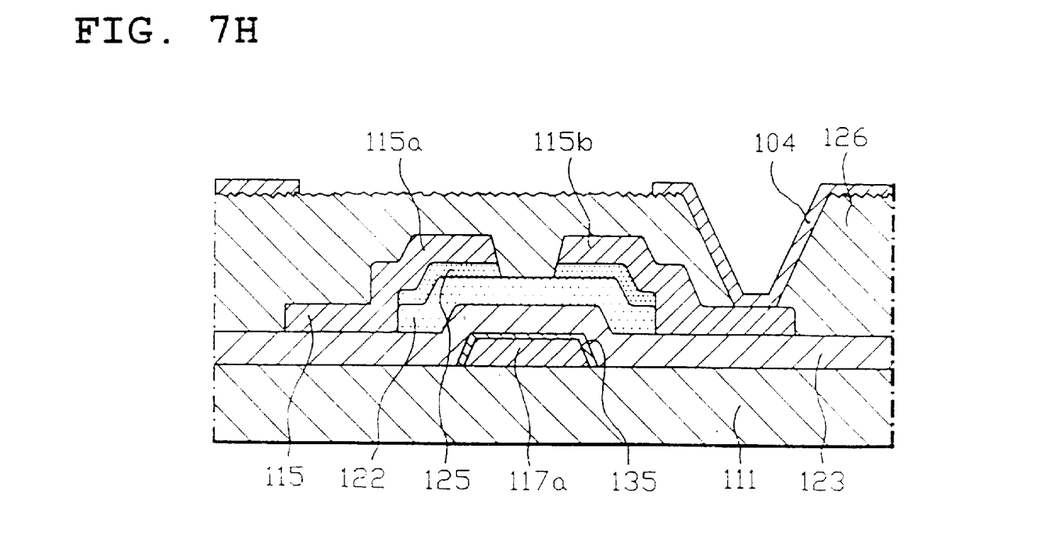

Thereafter, ITO is deposited on the protection layer 126 and is patterned to form a pixel electrode 104 by photolithography, as shown in FIG. 7H. Here, the pixel electrode 104 is connected to the drain electrode 115*b* through the contact hole 131 and overlaps at least one of the gate bus line and the data bus line.

According to the LCD of the present invention, a protection layer made of an organic insulating material covers the gate bus line, the data bus line, and the switching element. The surface of the protection layer is roughened by sputter etching, dry etching method or UV treatment. The roughened surface of the protection layer increases adhesion to an ITO layer. Therefore, the etchant for etching the ITO can not infiltrate into the interface between the ITO layer and the protection layer during the ITO patterning step.

Accordingly, the ITO layer can be precisely patterned to form a desired pattern of a pixel electrode in the present intention. The pixel electrode having such a desired pattern can prevent light leakage that would occur around the border of the pixel electrode and can improve contrast.

It will be apparent to those skilled in the art that various modifications and variations can be made in the liquid crystal display and the method of manufacturing the same of the present invention without departing from the spirit or scope of the invention. Thus, it is intended that the present invention cover the modifications and variations of this invention provided they come within the scope of the appended claims and their equivalents.

What is claimed is:

1. A method of manufacturing a liquid crystal display having a gate bus line, a data bus line, and a switching element with a drain electrode over a substrate, the method comprising the steps of:

forming a protection layer over the substrate to cover the gate bus line, the data bus line and the switching element;

removing a portion of the protection layer to define a contact hole in the protection layer over the drain electrode of the switching element;

exposing substantially an entire surface of the protection layer to an atmosphere that can remove some of atomic elements constituting the protection layer to convert substantially the entire surface of the protection layer to a roughened surface having a microscopic unevenness;

forming a transparent pixel electrode on the roughened surface of the protection layer, the transparent pixel electrode being connected to the drain electrode through the contact hole.

2. The method according to claim 1, wherein the step of forming the protection layer includes the step of depositing an organic insulating material over the substrate.

3. The method according to claim 2, wherein the step of depositing the organic insulating material includes the step of depositing at least one of polyimide resin, acrylic resin, thermosetting resin, and thermoplastic resin.

4. The method according to claim 2, wherein the step of depositing the organic insulating material includes the step of depositing at least one of benzocyclobutene, fluorinated polyimide, perfluorocyclobutane, and fluoropolyarylether.

5. The method according to claim 4, wherein the step of exposing includes the step of performing at least one of sputter etching, dry etching, and UV treatment on substantially the entire surface of the protection layer.

6. The method according to claim 2, wherein the step of depositing the organic insulating material includes the step of depositing a photosensitive organic material.

7. The method according to claim 6, wherein the step of removing includes the step of removing the portion of the protection layer by dry etching to define the contact hole.

8. The method according to claim 6, wherein the step of forming the transparent pixel electrode includes the step of forming the transparent pixel electrode to overlap at least one of the gate bus line and the data bus line.

9. The method according to claim 6, wherein the step of forming the transparent pixel electrode includes the step of depositing ITO over the substrate.

10. The method according to claim 1, wherein the step of exposing includes the step of performing at least one of sputter etching, dry etching, and UV treatment on substantially the entire surface of the protection layer.

11. The method according to claim 1, wherein the step of removing the portion of the protection layer is performed after the step of exposing substantially the entire surface of the protection layer.

12. The method according to claim 1, wherein the protection layer is an organic layer including at least C and H as constituent atomic elements, and wherein the step of exposing substantially an entire surface of the protection layer includes performing sputter etching on substantially the entire surface of the organic layer using one of Ar, $O_2$, and a gas containing Ar and $O_2$ to break off C or H radicals from the surface of the organic layer.

13. The method according to claim 1, wherein the protection layer is an organic layer including at least C and H as constituent atomic elements, and wherein the step of exposing substantially an entire surface of the protection layer includes performing dry etching on substantially the entire surface of the organic layer using a gas containing $O_2$ and at least one of F radicals and Cl radicals to remove C or H radicals from the surface of the organic layer.

14. The method according to claim 1, wherein the protection layer is an organic layer including at least C and H as constituent atomic elements, and wherein the step of exposing substantially an entire surface of the protection layer includes performing UV irradiation on substantially the entire surface of the organic layer to strip C or H radicals from the surface of the organic layer.

15. A method of manufacturing a laminated structure of an organic layer and a transparent conductive layer over a substrate for use in an LCD, the method comprising the steps of:

forming the organic layer over an substrate;

performing at least one of dry etching, sputter etching, and UV irradiation on substantially an entire surface of the organic layer to convert substantially the entire surface of the organic layer to a roughened surface having a microscopic unevenness; and forming the transparent conductive layer on the roughened surface of the organic layer.

16. The method according to claim 15, wherein the step of forming the organic layer includes the step of depositing at least one of benzocyclobutene, fluorinated polyimide, perfluorocyclobutane, and fluoropolyarylether, and wherein the step of forming the transparent conductive layer includes the step of depositing ITO.

17. The method according to claim 15, wherein the step of forming the organic layer includes the step of depositing at least one of polyimide resin, acrylic resin, thermosetting resin, and thermoplastic resin, and wherein the step of forming the transparent conductive layer includes the step of depositing ITO.

18. The method according to claim 15, wherein the step of performing includes performing sputter etching on substantially the entire surface of the organic layer using one of Ar, $O_2$, and a gas containing Ar and $O_2$ to break off C or H radicals from the surface of the organic layer.

19. The method according to claim 15, wherein the step of performing includes performing dry etching on substantially the entire surface of the organic layer using a gas containing $O_2$ and at least one of F radicals and Cl radicals to remove C or H radicals from the surface of the organic layer.

20. The method according to claim 15, wherein the step of performing includes performing UV irradiation on substantially the entire surface of the organic layer to strip C or H radicals from the surface of the organic layer.

* * * * *